(12) United States Patent
Pergande et al.

(10) Patent No.: US 6,298,900 B1
(45) Date of Patent: Oct. 9, 2001

(54) METHOD OF INTEGRATING WEAR PLATES INTO A SPRAY FORMED RAPID TOOL

(75) Inventors: Paul E. Pergande, Beverly Hills; Jeffrey A. Kinane, Birmingham; David R. Collins, Southgate, all of MI (US); Jim Welniak, Rossford, OH (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/110,355

(22) Filed: Jul. 6, 1998

(51) Int. Cl.[7] .................................................. B22D 23/00
(52) U.S. Cl. ............................................... 164/46; 164/98
(58) Field of Search ................................ 164/46, 98, 34, 164/35

(56) References Cited

U.S. PATENT DOCUMENTS

| 3,784,152 | 1/1974 | Garner et al. | |
|---|---|---|---|
| 5,027,878 | * 7/1991 | Revankar et al. | 164/34 |
| 5,169,549 | 12/1992 | Weber. | |
| 5,372,176 | 12/1994 | Brown et al. | |
| 5,407,487 | 4/1995 | Weber et al. | |
| 5,591,485 | 1/1997 | Weber et al. | |
| 5,609,922 | 3/1997 | McDonald. | |
| 5,658,506 | 8/1997 | White et al. | 264/28 |
| 5,967,218 | * 10/1999 | Pergande et al. | 164/98 |

FOREIGN PATENT DOCUMENTS

| 4112000 | * 9/1992 | (DE) | 164/98 |
|---|---|---|---|
| 55111242 | 2/1979 | (JP). | |
| WO8002811 | 12/1980 | (WO). | |
| WO 89/09669 | * 10/1989 | (WO) | 164/35 |
| WO9519859 | 7/1995 | (WO). | |
| WO9521733 | 8/1995 | (WO). | |

* cited by examiner

Primary Examiner—Tom Dunn
Assistant Examiner—Jonathan Johnson
(74) Attorney, Agent, or Firm—Damian Porcari

(57) ABSTRACT

A method of integrating wear plates into a spray formed rapid tool includes the steps of making a model of a desired tool and constructing a ceramic pattern as the inverse of the model. The method also includes the steps of locating at least one wear plate on the ceramic pattern and thermally spraying a metal material against the wear plate and ceramic pattern to form the desired tool and embedding the wear plate into the desired tool.

12 Claims, 2 Drawing Sheets

METHOD OF INTEGRATING WEAR PLATES INTO A SPRAY FORMED RAPID TOOL

BACKGROUND OF THE INVENTION

1. Field of the Invention

The present invention relates generally to spray formed rapid tools and, more specifically, to a method of integrating wear plates into a spray formed rapid tool.

2. Description of the Related Art

It is known to make a spray formed rapid tool. In spray forming, a master model of a desired tool is produced using a free form fabrication technique. This master model is then used to create a ceramic pattern which is the reverse of the desired tool to be produced. The resulting ceramic pattern is the receptor onto which metal is sprayed to form a deposit in the shape of the desired tool.

Typically, the spray forming process uses a wire-arc spraying. In wire-arc spraying, electric current is carried by two electrically conductive, consumable wires with an electric arc forming between the wire tips. A high-velocity gas jet blowing from behind the consumable wires strips away the molten metal which continuously forms as the wires are melted by the electric arc. The high-velocity gas jet breaks up or atomizes the molten metal into finer particles in order to create a fine distribution of molten metal droplets. The atomizing gas then accelerates the droplets away from the wire tips to the ceramic pattern where the molten metal droplets impact the ceramic pattern to incrementally form a deposit in the shape of the desired tool. The completed desired tool is then mounted and used to produce parts in conventional stamping, die casting, or molding processes.

Molds may be used for injection molding parts. The mold may include one or more slides for forming a particular feature of the molded part. Mold slides are common features in complex injection mold or die cast tools where undercuts are designed into the molded part. Mold slides are used to allow the molded part to be ejected from the mold without interfering or being trapped by the molding features which create the undercut in the molded parts.

Wear plates are typically provided in conventional molds to provide a hard, but machinable smooth bearing surface for the slides to run or ride on. The wear plate is positioned to guide the slide where it needs to go in the mold. Wear plates ease repairability of a mold and increase its life.

The spray formed rapid tool may be used in molds for injection molding parts. The spray formed rapid tool may be used with mold slides. Currently, wear plates for spray formed rapid tools are machined into the spray formed rapid tool after the spray process is completed. Although the wear plates machined into the spray formed rapid tool have worked well, they suffer from the disadvantage that the machining process is both laborious and time consuming. Another disadvantage is the thermal spray coatings are heavily oxidized and the wear plates can only be ground or electro discharge machined (EDM) into the spray formed rapid tool which is costly. Yet another disadvantage is that the high oxide content does not allow for weld repair or traditional machining processes on the wear plates of the spray formed rapid tool.

SUMMARY OF THE INVENTION

Accordingly, the present invention is a method of integrating wear plates into a spray formed rapid tool. The method includes the steps of making a model of a desired tool and constructing a ceramic pattern as the inverse of the model. The method also includes the steps of locating at least one wear plate on the ceramic pattern. The method further includes the steps of thermally spraying a metal material against the wear plate and ceramic pattern to form the desired tool and embedding the wear plate into the desired tool.

One advantage of the present invention is that a method is provided of integrating prefabricated cast or wrought wear plates into a spray formed rapid tool at the same time the spray material is being deposited. Another advantage of the present invention is that the integration of wear plates in a spray formed rapid tool shortens product development cycle time. Yet another advantage of the present invention is that the wear plate can be machined or modified after the spray formed deposit is completed. Still another advantage of the present invention is that the wear plate can be conventionally machined to make it parallel to the surface of the slide. A further advantage of the present invention is that the wear plate can be conventionally machined instead of using the EDM process, thereby saving time and cost. Yet, a further advantage of the present invention is that the method eliminates secondary machining of the thermal spray material. Still a further advantage of the present invention is that the method reduces material loss. Another advantage of the present invention is that the method improves yield, quality and repeatability.

Other features and advantages of the present invention will be readily appreciated as the same becomes better understood after reading the subsequent description taken in conjunction with the accompanying drawings.

DESCRIPTION OF THE PREFERRED EMBODIMENT(S)

Figure 1A:
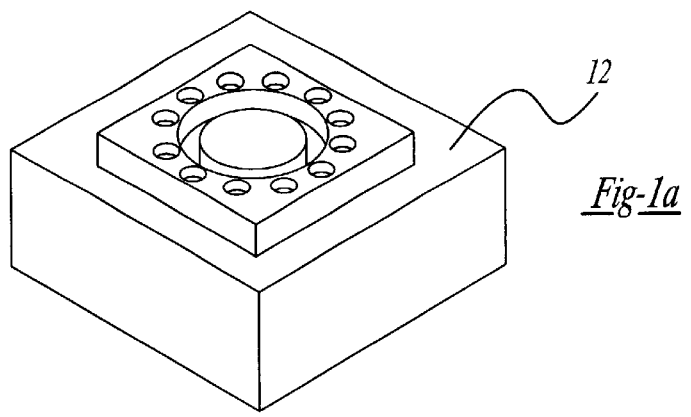
FIGS. 1A, 1B, 1C, 1D and 1E are a schematic flow diagram of a method of integrating wear plates into a spray formed rapid tool according to the present invention.
Figure 1B:
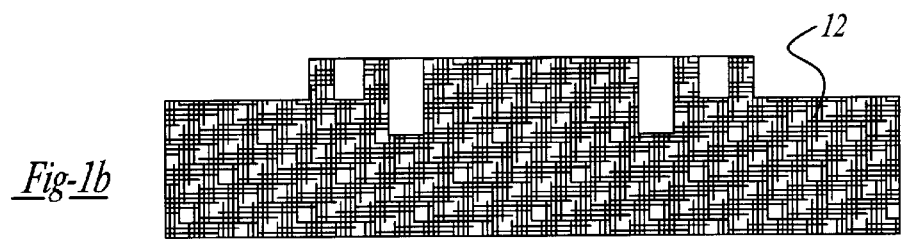

Referring to the drawings and in particular FIGS. 1A through 1E, one embodiment of a method of integrating wear plates into a spray formed rapid tool, according to the present invention, is shown. The method begins by creating or making a master model 12 of a desired tool as illustrated in FIGS. 1A and 1B. Typically, the master model 12 may be produced by using a CAD/CAM design and a free-form fabrication system such as stereo lithography. Such a process is disclosed in U.S. Pat. No. 5,658,506 to White et al., the disclosure of which is hereby incorporated by reference.

Figure 1C:
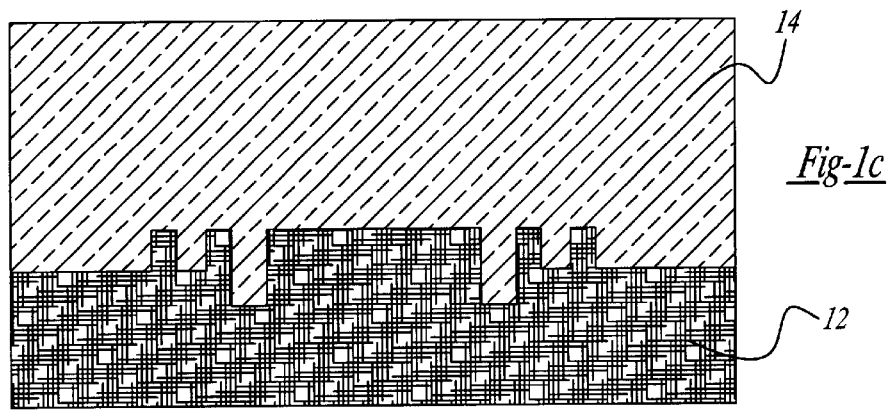

The method also includes the step of constructing a ceramic pattern 14 as the inverse of the master model 12 as illustrated in FIG. 1C. To create the ceramic pattern 14, the bottom of the master model 12 is adhered to a base plate (not shown) of an open box (not shown); the box is open at its top. A desired ceramic slurry is poured around the master model 12 to form the ceramic pattern 14 and completely covers its geometry to a thickness of greater than one (1) inch at the thinnest wall section. Entrapped air is minimized by vibrating the box and slurry contained therein on a table (not shown), preferably in a vacuum chamber (not shown). Depending on the character of the ceramic slurry that is employed, the ceramic pattern 14 is either (i) air dried, removed and then fired to finally cure it, or (ii) the ceramic slurry is freeze cast to temperatures around −30° F. and the master model 12 removed prior to the ceramic pattern 14 thawing out, or (iii) the ceramic slurry is dried and, then the master model 12 burned out while the ceramic pattern 14 is undergoing curing. The latter is conventional investment casting and is not desirable because of the possibility of shell cracking, lower shell strength and poor geometric compatibility with the spray process. Freeze casting is preferred.

The master model 12 is removed from the cured ceramic pattern 14 by installing screws (not shown) in the back of the master model 12 and pulling the master model 12 out physically. Alternatively, a stationary plate (not shown) may be used through which the extraction screws extend and the master model 12 is removed by turning the screws inward to pull against the stationary plate and also pull the master model 12 away from the ceramic pattern 14.

The ceramic material for the ceramic pattern 14 is selected-to provide a good surface finish (such as 1–4 microns), good thermal shock resistance value at temperatures of 1800°–2400° F., able to withstand up to, 2400° F. temperatures, have compressive strengths of about 9,000 psi and possess a low shrinkage (less than 0.3 percent) and possess low thermal expansion (1.0–4.0 E-6/degree F.) and have no reaction to molten metal. The ceramic material is selected to be capable of withstanding a molten metal environment and have a very smooth surface with good dimensional accuracy. The ceramic materials used include aluminum oxide ceramics, dental ceramics, investment casting slurries, fused silica and freeze cast alumina.

Figure 1D:
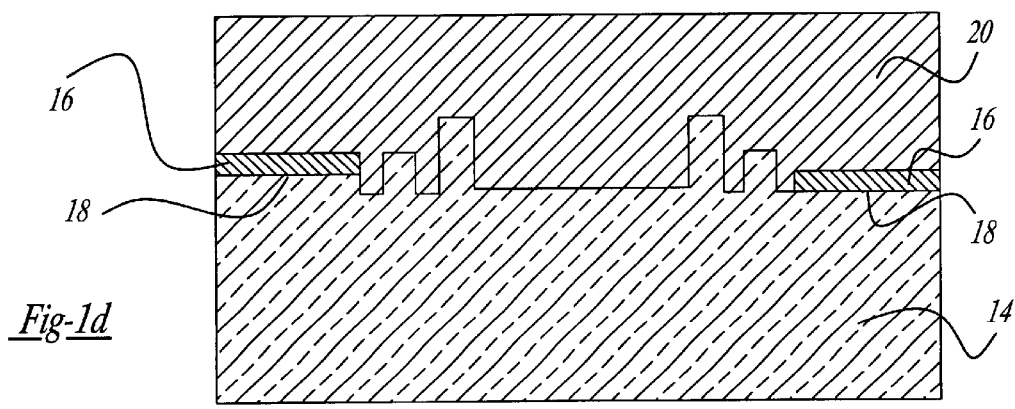

Referring to FIG. 1D, the method includes the step of locating at least one wear plate 16 on the ceramic pattern 14. Specifically, the wear plate 16 is inverted such that a slide contact surface 18 rests against the ceramic pattern 14 and is partially embedded in the ceramic pattern 14 to locate the wear plate 16 prior to the application of thermal spray. The wear plate 16 may be pinned in place on the ceramic pattern 14 by pins (not shown). The wear plate 16 and ceramic pattern 14 may be preheated before the wear plate 16 is located on the ceramic pattern 14 to improve adhesion between the thermal spray material and the wear plate 16 and the ceramic pattern 14. The wear plate 16 is made of a metal material such as steel as a prefabricated cast or wrought wear plate. The wear plate 16 may have its outer surfaces, to which the thermal spray is intended to adhere, roughened to improve adhesion of the spray material.

Figure 1E:
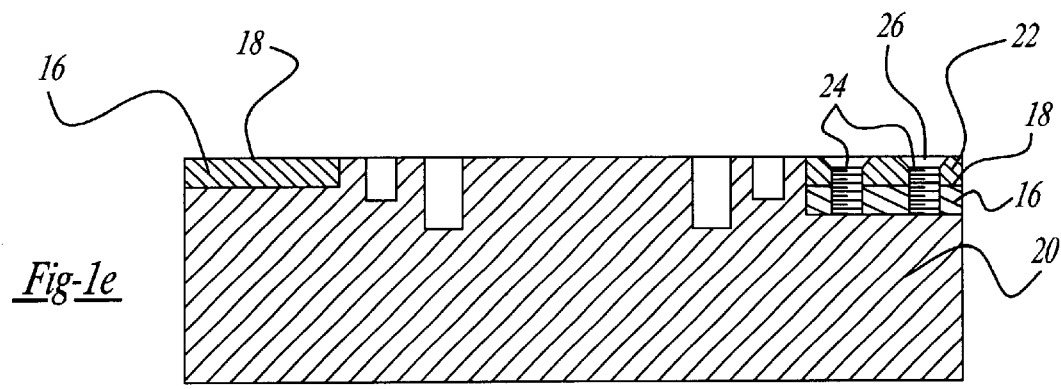

The method includes the step of thermally spraying a metal material against the wear plate 16 and ceramic pattern 14 to form a spray formed rapid tool 20 as the desired tool and embed the wear plate 16 into the spray formed rapid tool 20. Such step is desirably carried out by the wire arc spray process previously described. Another method to carry out the step of thermally spraying is the osprey process wherein a semi-solid slurry of hardenable metal material is sprayed from an induction heated nozzle supply and is impelled against the ceramic pattern 14 and wear plate 16 with a high velocity due to the high pressure gases that atomize the molten fluid. Metal droplets are formed from a melt that is atomized by gas (not from wire or powder). Continuous spraying is carried out to build up a layer that exceeds at least one quarter (¼) inch in thickness, at its thinnest section. As the spray is applied and built up, the wear plate 16 becomes embedded in the deposit as illustrated in FIGS. 1D and 1E.

The metal material includes metals such as zinc and high temperature, high strength carbon steel. These include certain tool steels such as A2 and plain carbon steel with (0.8% carbon by weight) as well as maraging steels. Maraging steels are difficult to machine and are seldom used for tooling, but can be readily spray formed to produce a desirable microstructure.

The density of the sprayed metal in accordance with this invention, will vary depending on the spray process used, but is generally between 95–99.5%. If the spray formed rapid tool 20 is made by the osprey process, the density will be 99.5% and if it is made by an arc spraying process such as twin arc, the density will be about 95%. The osprey process provides virtually no porosity in the as deposited metal because of the use of a semi-solid slurry that constantly feeds the solidifying metal material. The spraying process will result in little or no shrinkage because of such continuous feeding of deposited material. The osprey spraying process results in a finer microstructure.

Once the spray formed rapid tool 20 is formed, the ceramic pattern 14 is removed by chipping, grit blasting, or using a water jet. The slide contact surface 18 can be machined "true" to the rest of the spray formed rapid tool 20 after the spray process is complete if the wear plate 16 was not in the exact location during the spray deposition. The spray formed rapid tool 20 may include a removable wear plate 22 secured to the embedded wear plate 16 by suitable means such as screws 24. The removable wear plate 22 has a slide contact surface 26. The removable wear plate 22 can be replaced or modified as the slide contact surface 26 wears out.

Figure 2:
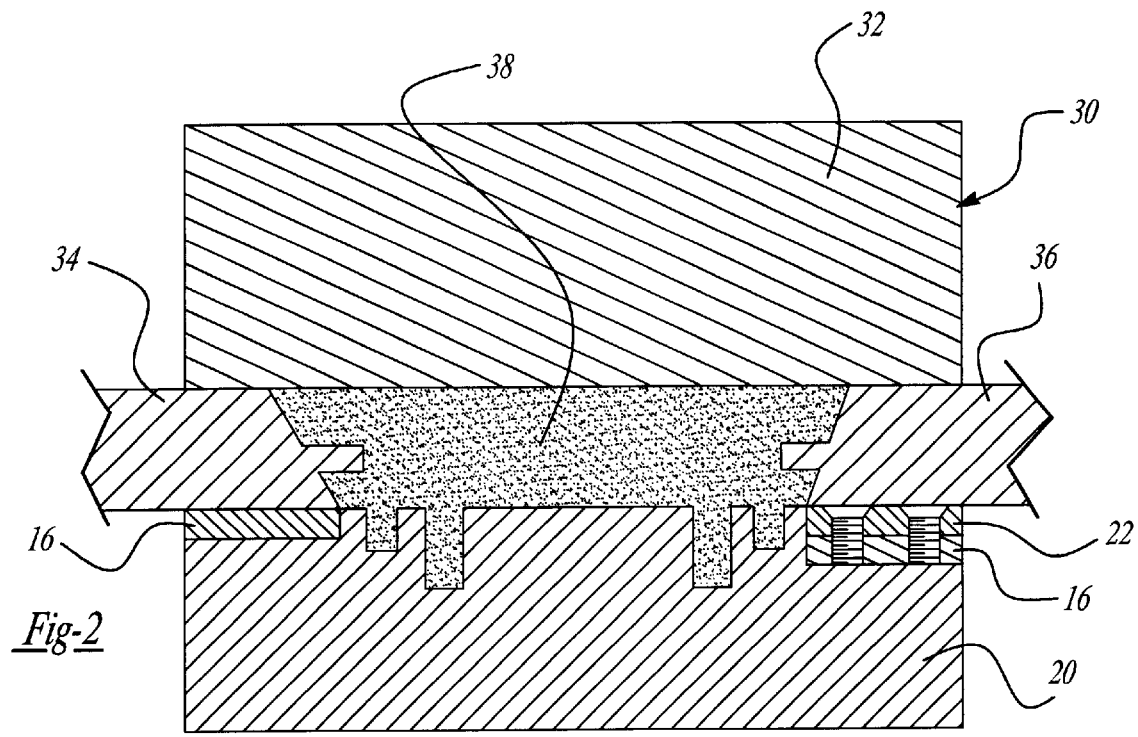
FIG. 2 is a fragmentary elevational view of the spray formed rapid tool of FIG. 1E used in a mold to produce an injection molded part.

Referring to FIG. 2, the completed spray formed rapid tool 20 may then be used in a die-set or mold, generally indicated at 30, mounted in an injection molding machine (not shown) and used to produce molded parts. For example, the spray formed rapid tool 20 may be the base of the mold 30. The mold 30 may include a top 32 and a first slide 34 disposed between one wear plate 16 and the top 32 and a second slide 36 disposed between the removable wear plate 22 and the top 32. The mold 30 is then injected with a material to produce a molded part 38. It should be appreciated that the slides 34, 36 run on or ride on the slide contact surfaces 18, 26 of the wear plates 16, 22.

The present invention has been described in an. illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A method of integrating wear plates into a spray formed rapid tool comprising the steps of;
   making a model of a desired tool;
   constructing a ceramic pattern as the inverse of the model;
   locating at least one metal wear plate on an outer surface of the ceramic pattern; and
   thermally spraying a metal material against the wear plate and ceramic pattern to form the desired tool and embedding the wear plate into the desired tool such that a portion of an outer surface of the wear plate is exposed.

2. A method as set forth in claim 1 including the step of separating the ceramic pattern from the model.

3. A method as set forth in claim 1 including the step of separating the ceramic pattern from the desired tool.

4. A method as set forth in claim 1 including the step of providing a prefabricated cast or wrought wear plate.

5. A method as set forth in claim 1 including the step of removably attaching another wear plate to the at least one wear plate after said step of thermally spraying.

6. A method of integrating wear plates into a spray formed rapid tool comprising the steps of:

making a model of a desired tool;

constructing a ceramic pattern as the inverse of the model;

separating the ceramic pattern from the model;

locating at least one metal wear plate having a slide contact surface on an outer surface of the ceramic pattern by inverting the wear plate such that the slide contact surface rests against the ceramic pattern;

thermally spraying a metal material against the wear plate and ceramic pattern to form the desired tool and embedding the wear plate into the desired tool such that the slide contact surface of the wear plate is exposed; and separating the ceramic pattern from the desired tool.

7. A method as set forth in claim 6 including the step of providing a prefabricated cast or wrought wear plate.

8. A method as set forth in claim 6 including the step of removably attaching another wear plate to the at least one wear plate after said step of thermally spraying.

9. A method of integrating wear plates into a spray formed rapid tool comprising the steps of:

making a model of a desired tool;

constructing a ceramic pattern as the inverse of the model;

locating at least one prefabricated cast or wrought metal wear plate having a slide contact surface on an outer surface of the ceramic pattern by inverting the wear plate such that the slide contact surface rests against the ceramic pattern and is partially embedded in the ceramic pattern; and thermally spraying a metal material against the wear plate and ceramic pattern to form the desired tool and embedding the wear plate into the desired tool such that the slide contact surface of the wear plate is exposed.

10. A method as set forth in claim 9 including the step of separating the ceramic pattern from the model.

11. A method as set forth in claim 9 including the step of separating the ceramic pattern from the desired tool.

12. A method as set forth in claim 9 including the step of removably attaching another wear plate to the at least one wear plate after said step of thermally spraying.

* * * * *